US011966357B2

(12) United States Patent
Huschle et al.

(10) Patent No.: US 11,966,357 B2
(45) Date of Patent: Apr. 23, 2024

(54) DYNAMIC SYSTEM RECONFIGURATION BY PARTITION

(71) Applicant: International Business Machines Corporation, Armonk, NY (US)

(72) Inventors: Tobias Huschle, Gaertringen (DE); Qais Noorshams, Frankfurt (DE); Norman Christopher Böwing, Böblingen (DE); Peter Klett, Horgen (CH); Pradeep Parameshwaran, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 17/657,960

(22) Filed: Apr. 5, 2022

(65) Prior Publication Data
US 2023/0315676 A1    Oct. 5, 2023

(51) Int. Cl.
G06F 15/78    (2006.01)
(52) U.S. Cl.
CPC .................. G06F 15/7882 (2013.01)
(58) Field of Classification Search
CPC .................................. G06F 15/7882
See application file for complete search history.

(56) References Cited

U.S. PATENT DOCUMENTS

| 7,152,157 | B2 | 12/2006 | Murphy |
| 10,873,604 | B1 | 12/2020 | Aloisio |
| 2004/0177244 | A1 | 9/2004 | Murphy |
| 2019/0007263 | A1 | 1/2019 | Lahiri |
| 2019/0303213 | A1 | 10/2019 | Chaganti |

FOREIGN PATENT DOCUMENTS

KR    101960396 B1    7/2019

OTHER PUBLICATIONS

"Patent Cooperation Treaty PCT International Search Report", Applicant's File Reference: International Application No. PCT/EP2023/058228, International Filing Date: Mar. 30, 2023, Date of Mailing: Jul. 3, 2023, 15 pages.
IBM, "z/OS Version 2 Release 4 Hardware Configuration Definition User's Guide", IBM, Jul. 10, 2019, 504 Pages.

Primary Examiner — Stefan Stoynov
(74) Attorney, Agent, or Firm — Michael O'Keefe

(57) ABSTRACT

In an approach to optimizing dynamic system reconfiguration, a computer receives an active system configuration and a target system configuration from a system administrator, where the target system configuration includes two or more logical partitions. A computer determines one or more reconfiguration actions required to transform the active system configuration to the target system configuration. A computer generates a dependency graph based on the determined reconfiguration actions. A computer divides the dependency graph along the two or more logical partitions. A computer sorts the determined reconfiguration actions by associated dependencies. A computer orders the determined reconfiguration actions based on a priority of each of the two or more logical partitions. A computer runs a first simulation of the determined reconfiguration actions for each of the two or more logical partitions. A computer performs the determined reconfiguration actions for each of the two or more logical partitions.

20 Claims, 8 Drawing Sheets

DYNAMIC SYSTEM RECONFIGURATION BY PARTITION

BACKGROUND OF THE INVENTION

The present invention relates generally to the field of system reconfiguration, and more particularly to optimizing operations-aware dynamic system reconfiguration by partition.

The use of virtualization is becoming widespread. Virtualization describes a software abstraction that separates a computer resource and its use from an underlying physical device. Generally, a virtual machine (VM) provides a software execution environment and may have a virtual processor, virtual system memory, virtual storage, and various virtual devices. Virtual machines have the ability to accomplish tasks independent of particular hardware implementations or configurations. System virtualization is implemented through some managing functionality, typically hypervisor technology. Hypervisors, also called virtual machine managers (VMMs), use a thin layer of code in software or firmware to achieve fine-grained, dynamic resource sharing. Because hypervisors provide the greatest level of flexibility in how virtual resources are defined and managed, they are generally the primary technology for system virtualization.

It is a common requirement for virtualized environments to be able to enforce strict partitioning between different classes of workload, while still sharing hardware between workloads of the same class. Separation may be required for several reasons. One reason may be to enable high availability, such that two clustered workloads do not share a single point-of-failure. Another reason is for performance guarantees, such that the resource demands of one class of resources do not affect another class. A third reason is the concern for confidentiality. For example, two competing organizations may wish to utilize a single provider of virtualized environments, with the requirement that hardware is not shared. Typically, the unit of segregation is that of a single host system, i.e., a single instance of a hypervisor.

Configuration of a computing environment includes defining and activating various hardware and software components of the computing environment, including, but not limited to, logical partitions (LPARs), input/output (I/O) configurations, operating systems, etc. Dynamic hardware reconfiguration is the process of changing the logical view of a system hardware definition while the system is running, i.e., making connections, disks, etc., visible to partitions running on the system without the need to reboot the system. Typically, configuration management software that performs dynamic hardware reconfiguration changes a system's active configuration to a target configuration in a transactional manner, i.e., in a single step. Changes that encompass multiple running partitions affect operating systems and applications running on those partitions. The changes may be disruptive and may require either all partitions to be changed to be offline during the dynamic reconfiguration or the system administrator to manually stage the system reconfiguration into multiple steps, each being less disruptive than the complete system reconfiguration, in order to limit downtimes and user impacts.

For example, a configuration consists of three partitions sharing a single channel path to access an I/O which needs to be reconfigured from using channel path A to using channel path B, but a maintenance window cannot be determined that suits all three tenants. If the change is done in a transactional manner, then all partitions are offline at the same time and for the total reconfiguration time. In order to avoid this, the system administrator can choose to move the partitions one after another to limit the impact in this multi-tenant scenario. Manual reconfiguration, however, has several drawbacks. For example, manual analysis of the necessary changes is prone to errors. In another example, the multiple manual changes are time consuming. In a further example, the tenants are dependent on the system administrator, and self-service is not available.

SUMMARY

A first aspect of the present invention discloses a computer-implemented method including a computer receiving an active system configuration and a target system configuration from a system administrator, where the target system configuration includes two or more logical partitions. A computer determines one or more reconfiguration actions required to transform the active system configuration to the target system configuration. A computer generates a dependency graph based on the determined one or more reconfiguration actions. A computer divides the dependency graph along the two or more logical partitions. A computer sorts the determined one or more reconfiguration actions by associated dependencies. A computer orders the determined one or more reconfiguration actions based on a priority of each of the two or more logical partitions. A computer runs a first simulation of the determined one or more reconfiguration actions for each of the two or more logical partitions. A computer performs the determined one or more reconfiguration actions for each of the two or more logical partitions. The present invention has the advantage of running a live simulation of the reconfiguration actions which limits the operational impact of the dynamic hardware reconfiguration by validating the defined order of reconfiguration actions prior to implementation.

A second aspect of the present invention discloses a computer program product including one or more computer readable storage media and program instructions collectively stored on the one or more computer readable storage media. The stored program instructions include program instructions to receive an active system configuration and a target system configuration from a system administrator, where the target system configuration includes two or more logical partitions. The stored program instructions include program instructions to determine one or more reconfiguration actions required to transform the active system configuration to the target system configuration. The stored program instructions include program instructions to generate a dependency graph based on the determined one or more reconfiguration actions. The stored program instructions include program instructions to divide the dependency graph along the two or more logical partitions. The stored program instructions include program instructions to sort the determined one or more reconfiguration actions by associated dependencies. The stored program instructions include program instructions to order the determined one or more reconfiguration actions based on a priority of each of the two or more logical partitions. The stored program instructions include program instructions to run a first simulation of the determined one or more reconfiguration actions for each of the two or more logical partitions. The stored program instructions include program instructions to perform the determined one or more reconfiguration actions for each of the two or more logical partitions.

A third aspect of the present invention discloses a computer system including one or more computer processors and one or more computer readable storage media, where program instructions are collectively stored on the one or more computer readable storage media. The stored program instructions include program instructions to receive an active system configuration and a target system configuration from a system administrator, where the target system configuration includes two or more logical partitions. The stored program instructions include program instructions to determine one or more reconfiguration actions required to transform the active system configuration to the target system configuration. The stored program instructions include program instructions to generate a dependency graph based on the determined one or more reconfiguration actions. The stored program instructions include program instructions to divide the dependency graph along the two or more logical partitions. The stored program instructions include program instructions to sort the determined one or more reconfiguration actions by associated dependencies. The stored program instructions include program instructions to order the determined one or more reconfiguration actions based on a priority of each of the two or more logical partitions. The stored program instructions include program instructions to run a first simulation of the determined one or more reconfiguration actions for each of the two or more logical partitions. The stored program instructions include program instructions to perform the determined one or more reconfiguration actions for each of the two or more logical partitions.

In another aspect, the present invention discloses a method for optimizing dynamic system reconfiguration including a computer ordering the determined one or more reconfiguration actions based on a priority of each of the two or more logical partitions, wherein the priority of each of the two or more logical partitions is based on a customer preference. An advantage of ordering the changes based on a customer preference is that the process is user-driven versus a default process. Another advantage of ordering the changes based on a customer preference is that by dividing necessary configuration changes into independent configuration change buckets, the present invention reduces the downtime of systems associated with preferred customers.

DETAILED DESCRIPTION

Embodiments of the present invention recognize that efficiency may be gained by determining required reconfiguration changes and defining an order in which to perform the changes based on a dependency graph, thus eliminating the need to disrupt all involved partitions for the full reconfiguration time. Embodiments of the present invention also recognize that efficiency may be gained by validating the defined order of reconfiguration actions with a live simulation, thus limiting the operational impact of the dynamic hardware reconfiguration. Implementation of embodiments of the invention may take a variety of forms, and exemplary implementation details are discussed subsequently with reference to the Figures.

Figure 1:
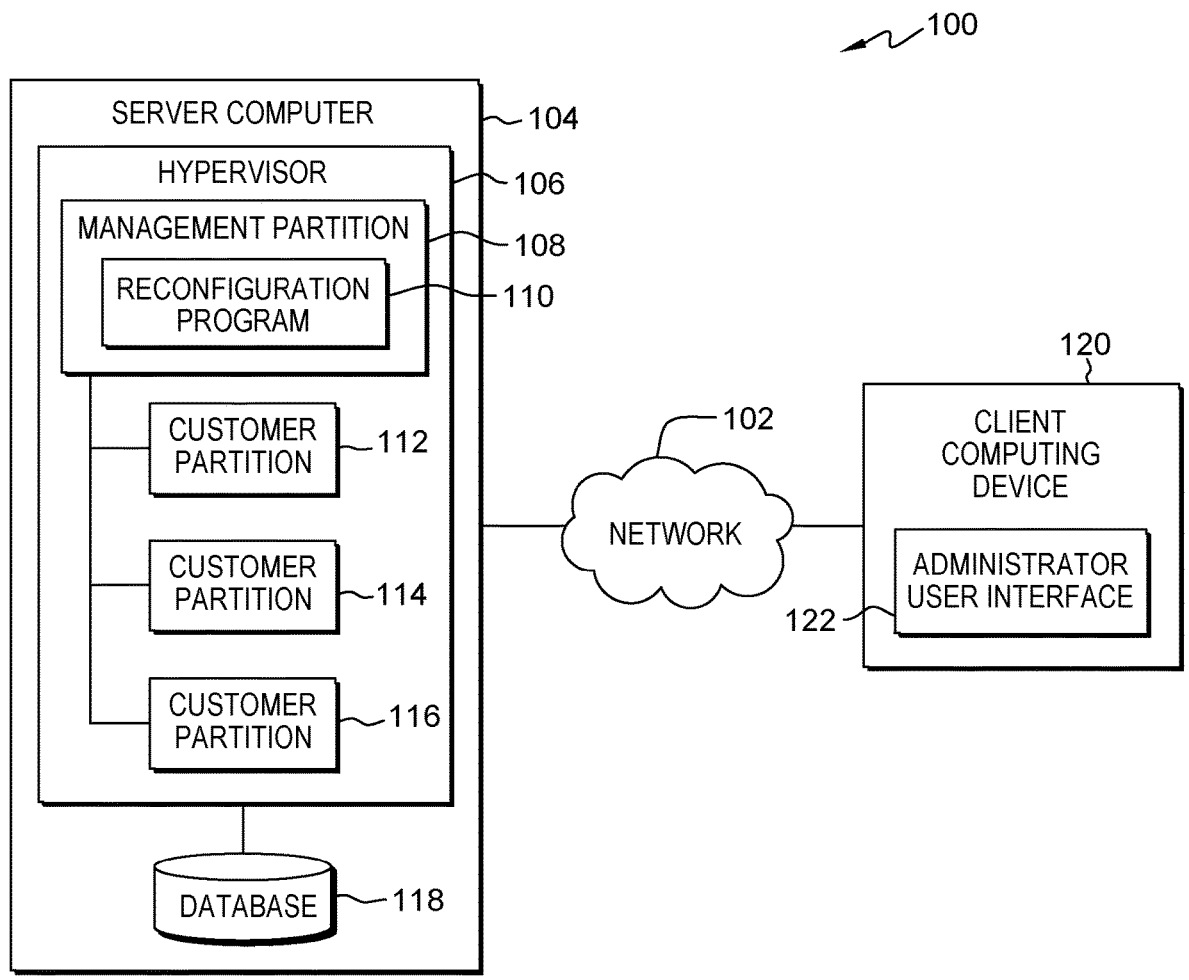
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 120, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 120, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes hypervisor 106 and database 118. Server computer 104 may include internal and external hardware components, as depicted and described in further detail with respect to FIG. 4.

Hypervisor 106 is computer software, firmware and/or hardware that creates and runs virtual machines, as would be recognized by a person of skill in the art. Hypervisor 106 presents guest operating systems with a virtual operating platform and manages the execution of the guest operating systems. Multiple instances of a variety of operating systems may share the virtualized hardware resources. Hypervisor 106 includes management partition 108, customer partition 112, customer partition 114, and customer partition 116.

Management partition 108, customer partition 112, customer partition 114, and customer partition 116 are each a logical partition (LPAR), i.e., a subset of hardware resources associated with server computer 104 and virtualized as a separate computer, as would be recognized by a person of skill in the art. Customer partition 112, customer partition 114, and customer partition 116 are each associated with a specific (i.e., different) customer. In an embodiment, management partition 108 includes configuration management software, not shown, which is capable of dynamic hardware reconfiguration, i.e., changing a logical view of the system hardware definition while the system is running. Management partition 108 includes reconfiguration program 110.

Reconfiguration program 110 limits the operational impact of a dynamic hardware reconfiguration by first, determining system changes needed for the reconfiguration; second, defining a reconfiguration change order based on operational effects; and third, simulating the reconfiguration changes for each partition to identify dependencies across partitions. Once reconfiguration program 110 confirms, via the simulation, that all changes can be applied successfully, then reconfiguration program 110 issues the changes in the identified order. An advantage of using reconfiguration program 110 is that it enables configuration changes to be localized, i.e., isolated, within partitions, which, in turn, enables multi-tenancy within a hypervisor, such as hypervisor 106. In the depicted embodiment, reconfiguration program 110 is a standalone product. In another embodiment, reconfiguration program 110 is a component of configuration management software.

Reconfiguration program 110 receives active and target I/O configurations. Reconfiguration program 110 determines actions needed to get to the target I/O configuration. Reconfiguration program 110 generates a dependency graph based on the determined actions. Reconfiguration program 110 divides the dependency graph according to partitions. Reconfiguration program 110 sorts the actions based on the dependencies and orders the actions based on partition priorities. Reconfiguration program 110 identifies dependencies across partitions. Reconfiguration program 110 simulates the target actions for each partition and evaluates the results of the simulation. If reconfiguration program 110 determines the simulation identifies a problem, then reconfiguration program 110 adds the identified additional dependencies and repeats the simulation. If reconfiguration program 110 determines the simulation does not identify a problem, then reconfiguration program 110 performs the reconfiguration actions in the identified order. Reconfiguration program 110 is depicted and described in further detail with respect to FIG. 2 and FIGS. 3A-FIG. 3E.

Database 118 stores information used and generated by reconfiguration program 110. In the depicted embodiment, database 118 resides on server computer 104. In another embodiment, database 118 may reside elsewhere within distributed data processing environment 100, provided that reconfiguration program 110 has access to database 118. A database is an organized collection of data. Database 118 can be implemented with any type of storage device capable of storing data and configuration files that can be accessed and utilized by reconfiguration program 110, such as a database server, a hard disk drive, or a flash memory. Database 118 stores customer preferences with respect to scheduling downtime for customers associated with customer partition 112, customer partition 114, and/or customer partition 116. Database 118 also stores priorities associated with the customer preferences, as defined by the system administrator, i.e., the user of client computing device 120. In addition, database 118 stores one or more configuration profiles determined by reconfiguration program 110. In an embodiment, database 118 stores analytics or diagnostic information used by the system administrator.

Client computing device 120 can be one or more of a laptop computer, a tablet computer, a smart phone, smart watch, a smart speaker, or any programmable electronic device capable of communicating with various components and devices within distributed data processing environment 100, via network 102. Client computing device 120 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In an embodiment, the wearable computer may be in the form of a smart watch. In one embodiment, the wearable computer may be in the form of a head mounted display. The head mounted display may take the form-factor of a pair of glasses, such as augmented reality (AR) glasses. In an embodiment, client computing device 120 may be integrated into a vehicle of the user. For example, client computing device 120 may include a heads-up display in the windshield of the vehicle. In general, client computing device 120 represents one or more programmable electronic devices or combination of programmable electronic devices capable of executing machine readable program instructions and communicating with other computing devices (not shown) within distributed data processing environment 100 via a network, such as network 102. Client computing device 120 includes an instance of administrator user interface 122.

Administrator user interface 122 provides an interface between reconfiguration program 110 on server computer 104 and a user of client computing device 120. In one embodiment, administrator user interface 122 is mobile application software. Mobile application software, or an "app," is a computer program designed to run on smart phones, tablet computers and other mobile devices. In one embodiment, administrator user interface 122 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Administrator user interface 122 enables a user of client computing device 120 to store customer preferences in database 118. In an embodiment, administrator user interface 122 is a component of an operating system (OS) that provides system administrators and advanced users an interface for configuring, monitoring, and servicing a system. Administrator user interface 122 enables a system administrator to manage many systems and partitions. Administrator user interface 122 can store analytics or diagnostic information in database 118, via network 102.

Figure 2:
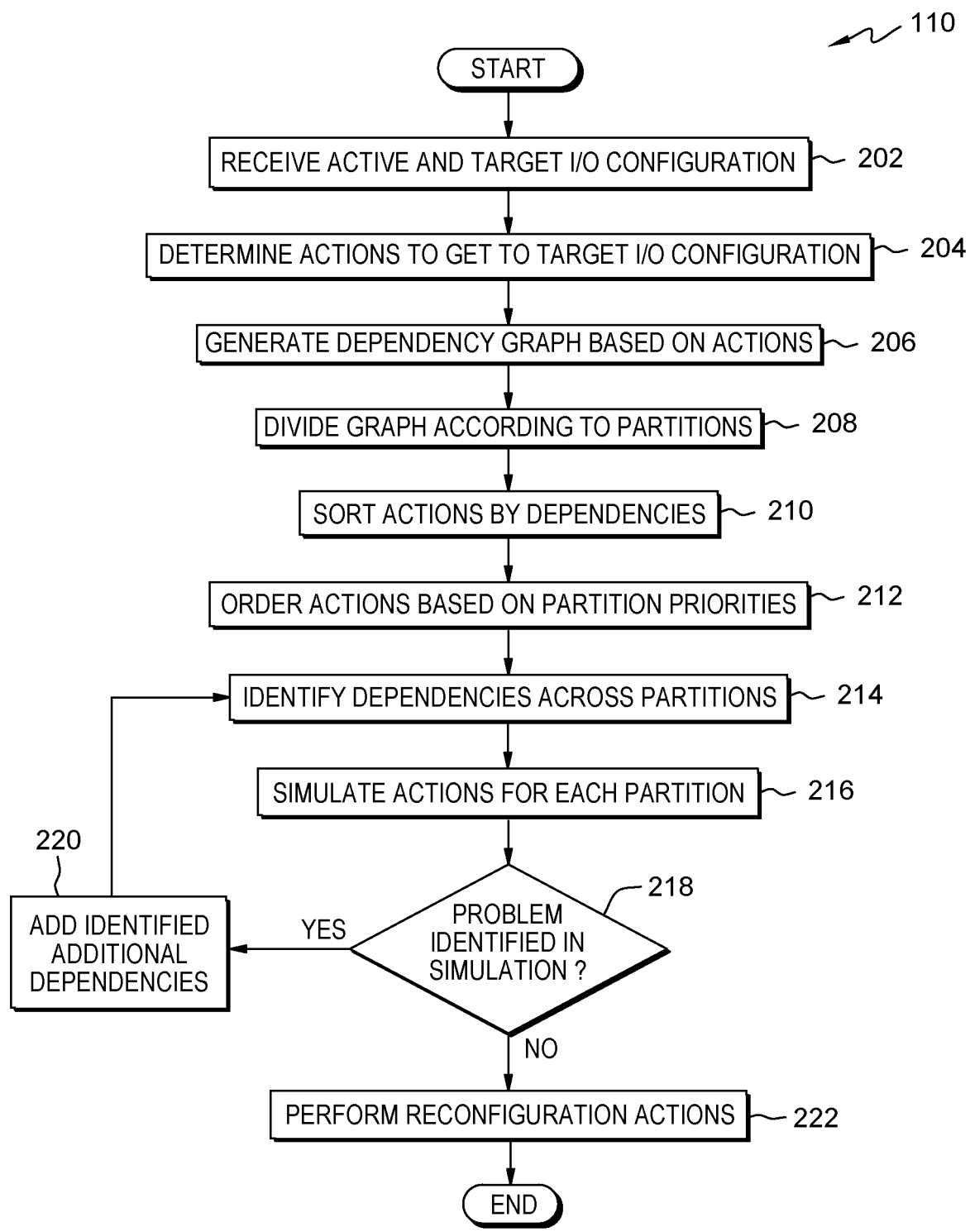
FIG. 2 is a flowchart depicting operational steps of a reconfiguration program, on a server computer within the distributed data processing environment of FIG. 1, for optimizing dynamic system reconfiguration, in accordance with an embodiment of the present invention.

FIG. 2 is a flowchart depicting operational steps of reconfiguration program 110, on server computer 104 within distributed data processing environment 100 of FIG. 1, for optimizing dynamic system reconfiguration, in accordance with an embodiment of the present invention.

Reconfiguration program 110 receives active and target I/O configurations (step 202). In an embodiment, when a system administrator, i.e., a user of client computing device 120, triggers a dynamic system reconfiguration via administrator user interface 122, reconfiguration program 110 receives the active configuration, i.e., the "as-is" configuration, as well as the target configuration, i.e., the "to-be" configuration. The active and target I/O configurations are for a set of logical partitions, such as customer partition 112, customer partition 114, and customer partition 116.

Reconfiguration program 110 determines actions needed to get to the target I/O configuration (step 204). In an embodiment, reconfiguration program 110 compares the active I/O configuration to the target I/O configuration by performing hierarchical delta calculations to determine the differences between the two configurations. Based on the calculations, reconfiguration program 110 determines the actions necessary to transform the active configuration to the target configuration. Actions may include, but are not limited to, adding, modifying, and/or deleting one or more I/O elements. For example, if the active configuration includes two control units and the target configuration includes one control unit, then reconfiguration program 110 determines an action of deleting one of the control units.

Reconfiguration program 110 generates a dependency graph based on the actions (step 206). In an embodiment, based on the determined actions, reconfiguration program 110 generates a dependency graph that represents which of the previously determined actions belong to which I/O element and which I/O elements depend on which other elements. In an embodiment, the dependency graph is a data structure that represents how the different I/O elements depend on each other. I/O elements may include, but are not limited to, applications, LPARs, functions, channel paths, control units, and/or devices. Dependencies between the I/O elements may include, but are not limited to, partition to function, partition to channel path, channel path to control unit, and control unit to device.

Reconfiguration program 110 divides the dependency graph according to partitions (step 208). In an embodiment, reconfiguration program 110 divides the dependency graph into sub-graphs along the LPARs, such as customer partition 112, customer partition 114, and customer partition 116, to determine which actions affect each partition within the partition. In an embodiment, one or more actions may affect more than one partition. This step will be discussed further with respect to FIG. 3B.

Reconfiguration program 110 sorts the actions based on the dependencies (step 210). In an embodiment, reconfiguration program 110 sorts the elements to be changed within a partition based on their dependencies, such as, if element A depends on element B, then reconfiguration program 110 performs the change to element B before performing the change to element A. For example, a control unit is a logical entity for a device in a system configuration. If the reconfiguration actions include deleting both the control unit and the device, then the system architecture requires the device to be deleted before the control unit because deleting the control unit first, while the device is actively dependent on the control unit in the configuration, would result in an error. In another example, a device cannot be added to a configuration before the control unit the device will be dependent on is added first.

Reconfiguration program 110 orders the actions based on partition priorities (step 212). In an embodiment, reconfiguration program 110 puts the reconfiguration actions into an order based on priorities of each partition in an effort to reduce downtime. In an embodiment, the user of client computing device 120, i.e., the system administrator, stores priorities and preferences of each customer associated with each customer partition in database 118 such that reconfiguration program 110 can retrieve the priorities from database 118. For example, a customer associated with customer partition 112 may have a preferred day of the week for system downtime, such that as long as the maintenance window is on a Saturday, the downtime can be for several hours. In another example, a customer associated with customer partition 114 may have a critical application running and prefers to minimize system downtime over any other preference. In an embodiment, the system administrator defines the priorities using a weighted sum that reflects the importance of the infrastructure for each customer. An advantage of ordering the changes by priority is that the process is user-driven versus a default process. Another advantage of ordering the changes by priority is that by dividing necessary configuration changes into independent configuration change buckets, reconfiguration program 110 reduces the downtime of systems associated with preferred customers. Reconfiguration program 110 orders the actions to bring up the highest priority partition first. In addition, reconfiguration program 110 can order changes that affect multiple partitions to reduce the downtime of higher priority partitions.

Reconfiguration program 110 identifies dependencies across partitions (step 214). In an embodiment, reconfiguration program 110 identifies one or more dependencies between two or more partitions. For example, if the reconfiguration actions include deleting a control unit that is connected via two channel paths to two different partitions, then both partitions are dependent on the control unit deletion action. An advantage of identifying dependencies across partitions is that it enables independent partition maintenance windows even for configuration changes that encompass multiple partitions.

Reconfiguration program 110 simulates the actions for each partition (step 216). In an embodiment, reconfiguration program 110 runs a simulation of the reconfiguration actions in the defined order to test the actions determined to transform the active configuration to the target configuration as a dry run, without actually changing the I/O configuration of the system. The simulation is a loop through step where, in each logical partition, reconfiguration program 110 test triggers the changes based on the different dependencies to determine potential problems, such as unavailability of devices and/or control units, channel path errors, etc. An advantage of running a live simulation of the reconfiguration actions is limiting the operational impact of the dynamic hardware reconfiguration. Reconfiguration program 110 repeats the simulation step for all of the dependencies within a partition. In an embodiment, reconfiguration program 110 runs the simulation in a simulation environment firmware (not shown) that supports dynamically triggering the I/O configuration changes as well as controlling the offline/online status of each I/O element. In the embodiment, the simulation environment is also capable of defining one or more partitions and running a workload on the one or more partitions.

Reconfiguration program 110 determines whether the simulation identifies a problem (decision block 218). In an embodiment, reconfiguration program 110 analyzes the results of the simulation and determines whether a problem and/or an error occurred. In an embodiment, reconfiguration program 110 determines whether the problem and/or error is associated with one or more runtime dependencies.

If reconfiguration program 110 determines the simulation identifies a problem ("yes" branch, decision block 218), then reconfiguration program 110 adds the identified additional dependencies (step 220). In an embodiment, based on the results of the simulation, reconfiguration program 110 determines one or more additional runtime dependencies that had not been previously considered in step 214 and adds the one or more additional runtime dependencies to the dependency graph. In an embodiment, after adding the additional dependencies, reconfiguration program 110 returns to step 214 and repeats the simulation. In an embodiment, in response to identifying a problem, reconfiguration program 110 notifies the system administrator via administrator user interface 122.

If reconfiguration program 110 determines the simulation does not identify a problem ("no" branch, decision block 218), then reconfiguration program 110 performs the reconfiguration actions (step 222). In an embodiment, the result of a successful simulation is a configuration profile that confirms that all changes can be applied and will be successful when reconfiguration program 110 triggers the reconfiguration actions in the identified order. In an embodiment, reconfiguration program 110 performs the reconfiguration actions in the identified order. In an embodiment, reconfiguration program 110 notifies the system administrator, via administrator user interface 122, that the simulation was successful, and the system administrator triggers the reconfiguration actions at an appropriate time. In an embodiment, reconfiguration program 110 stores the configuration profile in database 118.

Figure 3A:
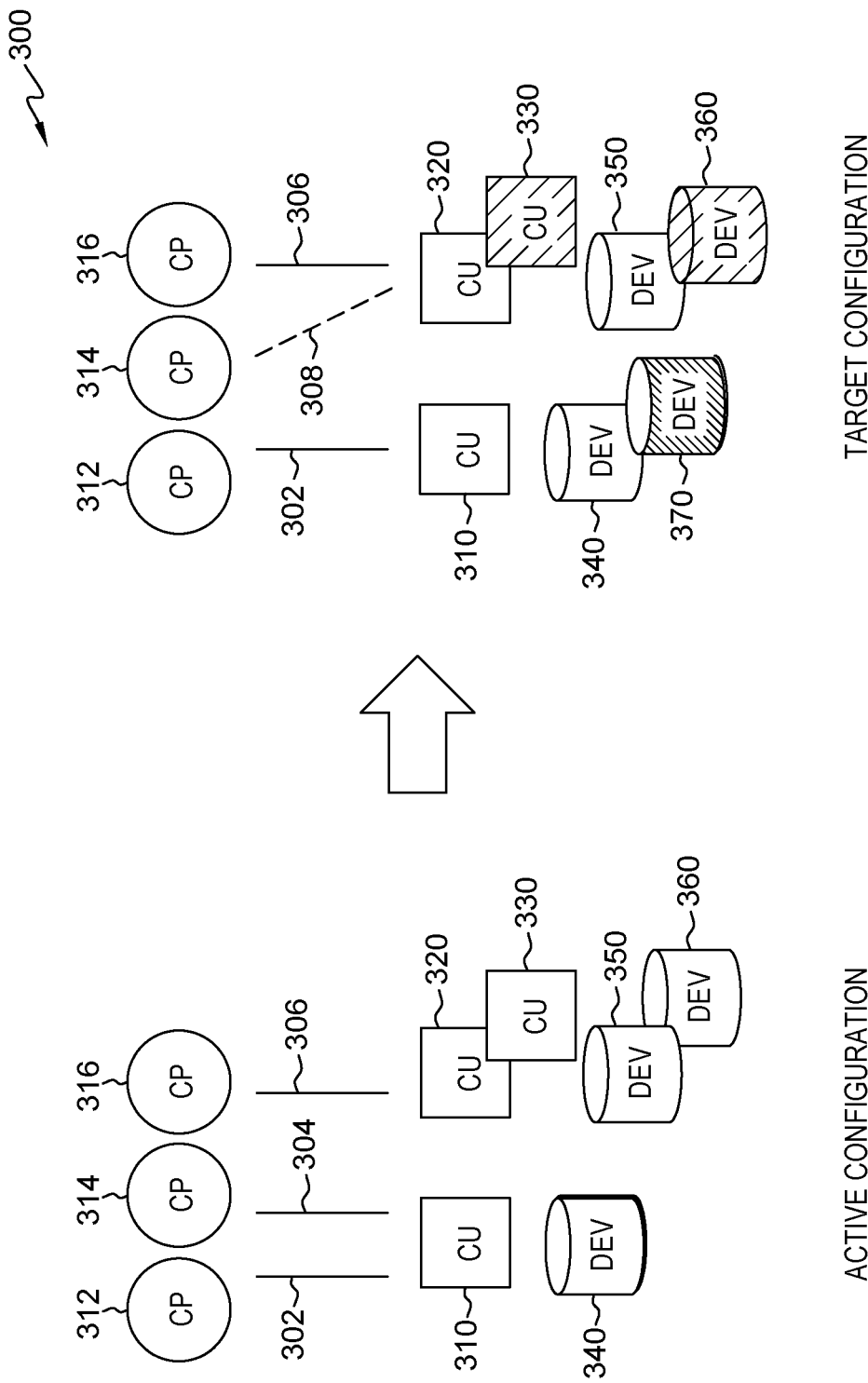
FIG. 3A illustrates an example of steps performed by the reconfiguration program within the distributed data processing environment of FIG. 1, in accordance with an embodiment of the present invention.

FIG. 3A illustrates example 300 of steps performed by reconfiguration program 110 within distributed data processing environment 100 of FIG. 1, in accordance with an embodiment of the present invention. FIG. 3A represents step 202, as discussed with respect to FIG. 2, by depicting the active configuration and the target configuration as received by reconfiguration program 110. The active configuration includes customer partition 312, representing customer partition 112 of FIG. 1, customer partition 314, representing customer partition 114 of FIG. 1, and customer partition 316, representing customer partition 116 of FIG. 1. In the active configuration, customer partition 312 and customer partition 314 are connected to control unit 310 by channel path 302 and channel path 304, respectively. Further, control unit 310 is associated with device 340. Also in the active configuration, customer partition 316 is connected to control unit 320 and control unit 330 by channel path 306. Control unit 320 and control unit 330 are associated with device 350 and device 360.

The target configuration indicates the changes to the active configuration determined by reconfiguration program 110, as discussed with respect to step 204 of FIG. 2. The target configuration also includes customer partition 312, customer partition 314, and customer partition 316. For customer partition 312, the channel path and control unit remain the same, as does the association with device 340, but reconfiguration program 110 determines the action of adding device 370. For customer partition 314, reconfiguration program 110 determines that the channel path changes from channel path 304 to channel path 308, which is connected to control unit 320. Further, reconfiguration program 110 determines the actions of deleting control unit 330 and device 360.

Figure 3B:
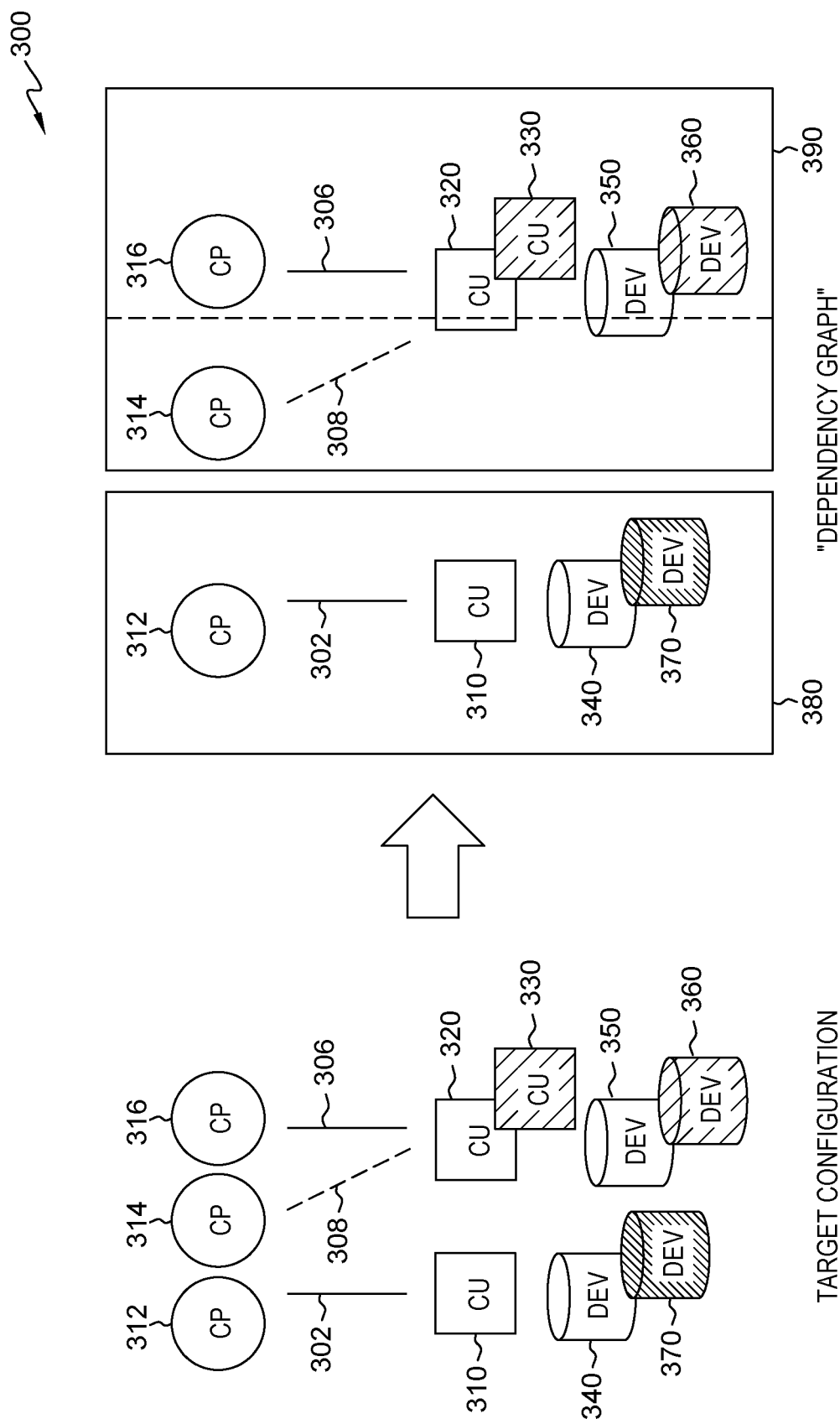
FIG. 3B illustrates a continuation of the example of steps performed by the reconfiguration program within the distributed data processing environment of FIG. 1, in accordance with an embodiment of the present invention.

FIG. 3B illustrates a continuation of example 300 of steps performed by reconfiguration program 110 within distributed data processing environment 100 of FIG. 1, in accordance with an embodiment of the present invention. FIG. 3B represents steps 206 and 208, as discussed with respect to FIG. 2, by depicting reconfiguration program 110 generating a dependency graph based on the actions and dividing the dependency graph into sub-graphs along the partitions. The target configuration of FIG. 3A is repeated on the left side of FIG. 3B. On the right side of FIG. 3B is a visualization of a dependency graph data structure, where reconfiguration program 110 has divided the graph into sub-graph 380 and sub-graph 390. Sub-graph 380 includes customer partition 312 connected to control unit 310 by channel path 302 and associated with device 340 and the added device 370. Sub-graph 390 includes customer partition 314 connected to control unit 320 by channel path 308 and customer partition 316 connected to control unit 320 by channel path 306. The dotted line in sub-graph 390 indicates the division of the graph along the partitions. Reconfiguration program 110 determines that adding device 370 only affects customer partition 312 because customer partition 314 and customer partition 316 do not have a path to device 370. Reconfiguration program 110 also determines that deleting control unit 330 and device 360 affects both customer partition 314 and customer partition 316.

Figure 3C:
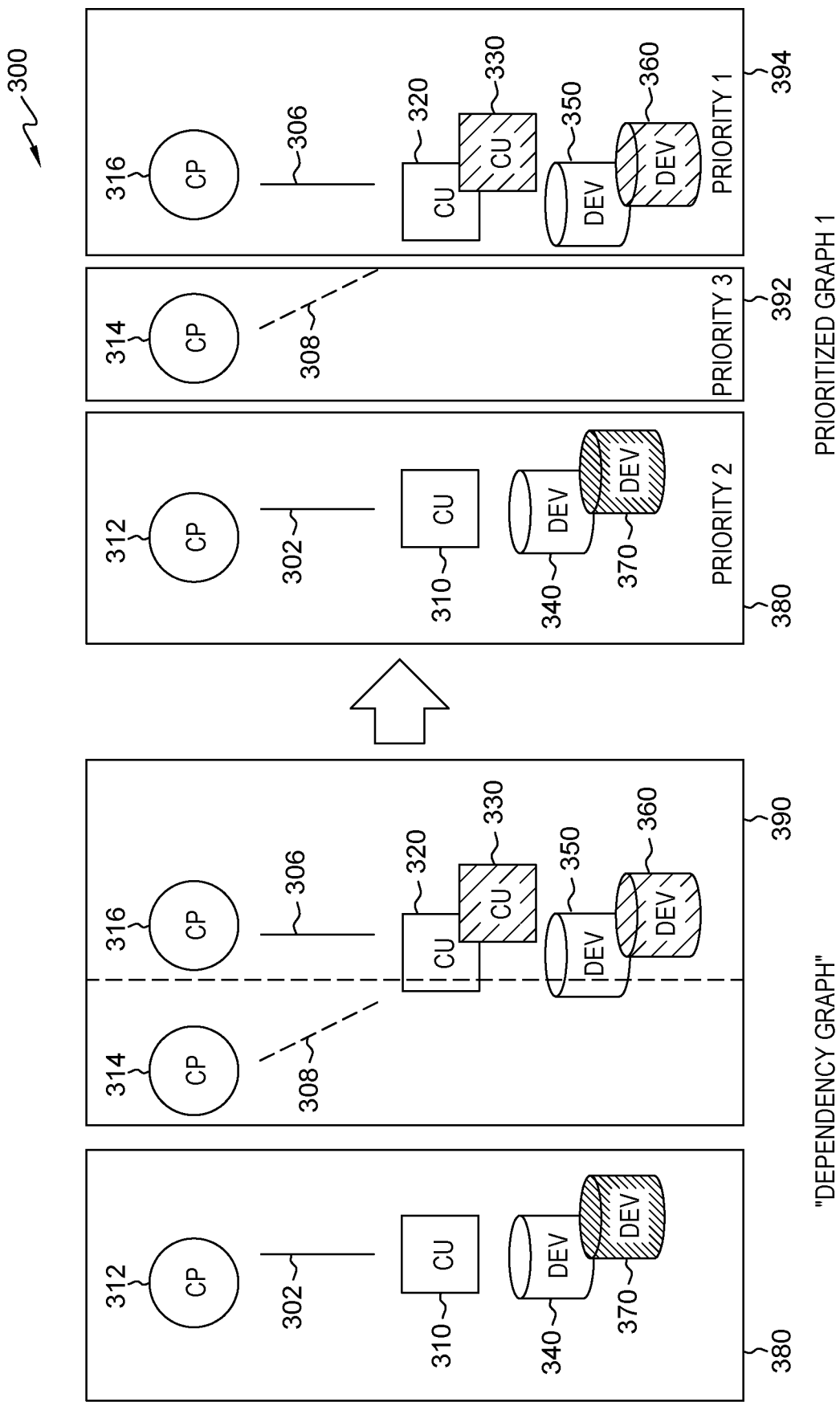
FIG. 3C illustrates a continuation of the example of another step performed by the reconfiguration program within the distributed data processing environment of FIG. 1, in accordance with an embodiment of the present invention.

FIG. 3C illustrates a continuation of example 300 of another step performed by reconfiguration program 110 within distributed data processing environment 100 of FIG. 1, in accordance with an embodiment of the present invention. The "dependency graph" of FIG. 3B is repeated on the left side of FIG. 3C. On the right side of FIG. 3C is a visualization of reconfiguration program 110 ordering actions based on partition priorities, referred to as prioritized graph 1, as discussed with respect to step 212 of FIG. 2. In the depicted example, sub-graph 394 includes the partition with the highest priority, as defined by the system administrator, while sub-graph 380 is the second priority and sub-graph 392 is the lowest priority. Thus, reconfiguration program 110 orders the actions such that the changes depicted in sub-graph 394 will be performed first, enabling the elements of sub-graph 394 to be brought back online even before reconfiguration program 110 triggers the other changes.

Figure 3D:
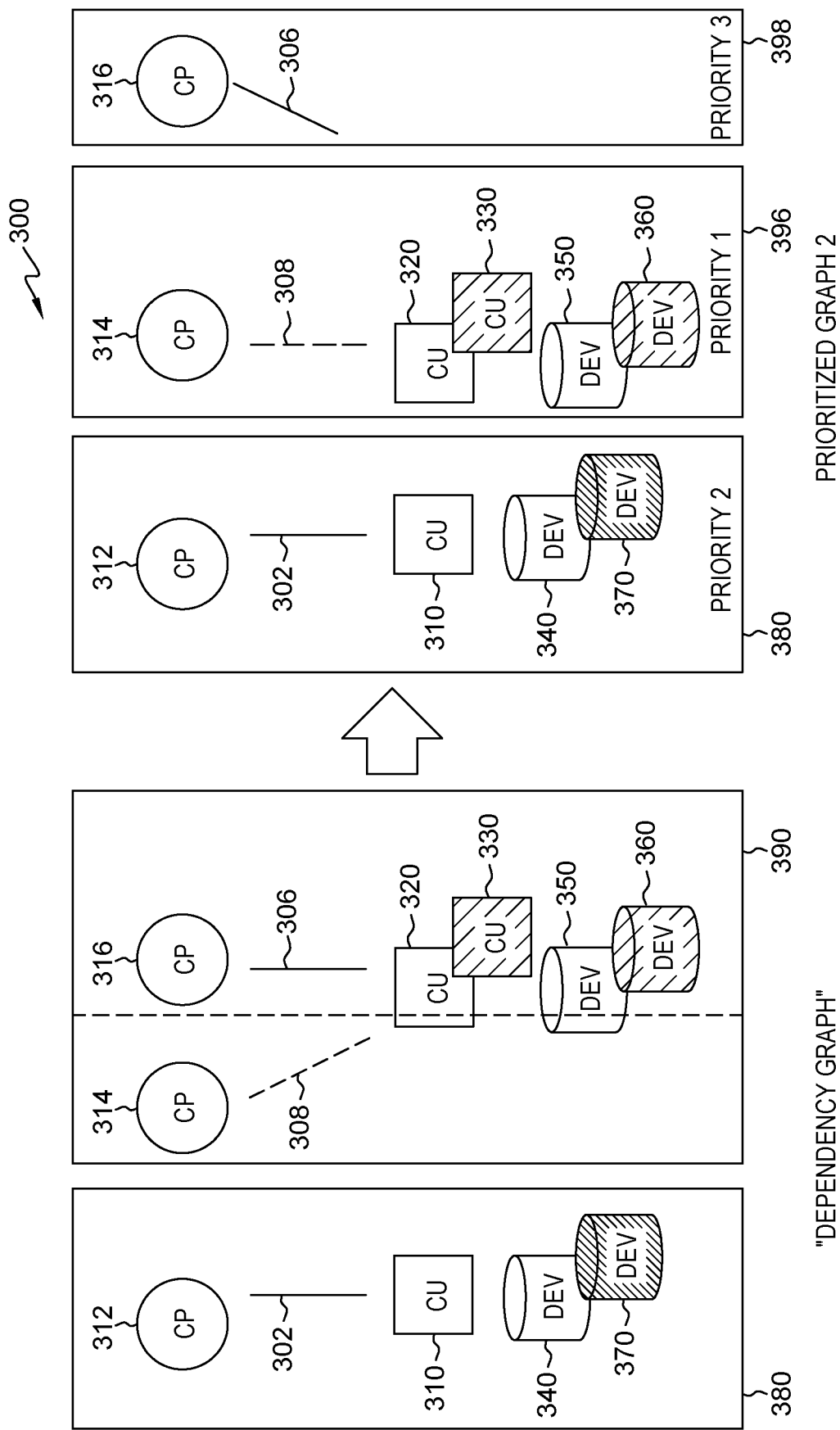
FIG. 3D illustrates another continuation of the example of a step performed by the reconfiguration program within the distributed data processing environment of FIG. 1, in accordance with an embodiment of the present invention.

FIG. 3D illustrates another continuation of example 300 of a step performed by reconfiguration program 110 within distributed data processing environment 100 of FIG. 1, in accordance with an embodiment of the present invention. The "dependency graph" of FIG. 3B is repeated on the left side of FIG. 3D. On the right side of FIG. 3C is a visualization of reconfiguration program 110 ordering actions based on partition priorities, referred to as prioritized graph 2, as discussed with respect to step 212 of FIG. 2. FIG. 3D differs from FIG. 3C in that the system administrator has set the priorities differently, i.e., sub-graph 396 has the highest priority, sub-graph 380 is the second priority, and sub-graph 398 is the lowest priority. Reconfiguration program 110 groups the actions differently to accommodate the priorities.

Figure 3E:
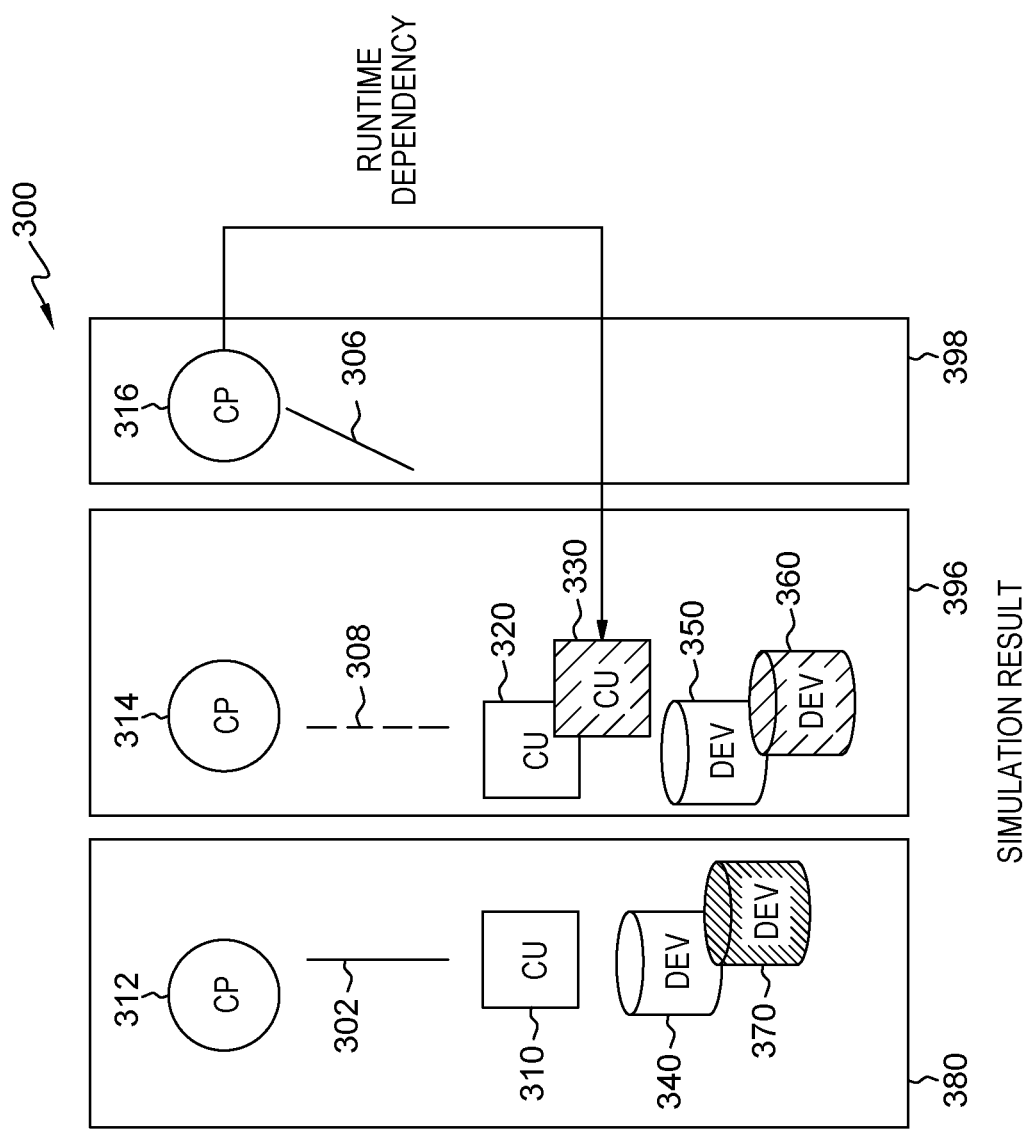
FIG. 3E illustrates a continuation of the example of additional steps performed by the reconfiguration program within the distributed data processing environment of FIG. 1, in accordance with an embodiment of the present invention.

FIG. 3E illustrates a continuation of example 300 of additional steps performed by reconfiguration program 110 within distributed data processing environment 100 of FIG. 1, in accordance with an embodiment of the present invention. FIG. 3E represents step 216, decision block 218, and step 220, as discussed with respect to FIG. 2, by depicting the results of reconfiguration program 110 simulating the actions for each partition, determining the simulation identified a problem, adding the dependencies discovered in the simulation, and re-running the simulation. The initial simulation (not shown) indicated that customer partition 316, as displayed in sub-graph 398, has no elements that need to be reconfigured ("no-op") but an error indicated that customer partition 316 has a runtime dependency on control unit 330. Thus, the order of the reconfiguration actions has to ensure that channel path 306 is set offline prior to the deletion of control unit 330. Reconfiguration program 110 adds the discovered dependency to the dependency graph and repeats the simulation. Reconfiguration program 110 continues to loop through this process until the simulation is successful, thus resulting in a specified order of required actions that will yield a successful reconfiguration and minimize downtime for the customers.

Figure 4:
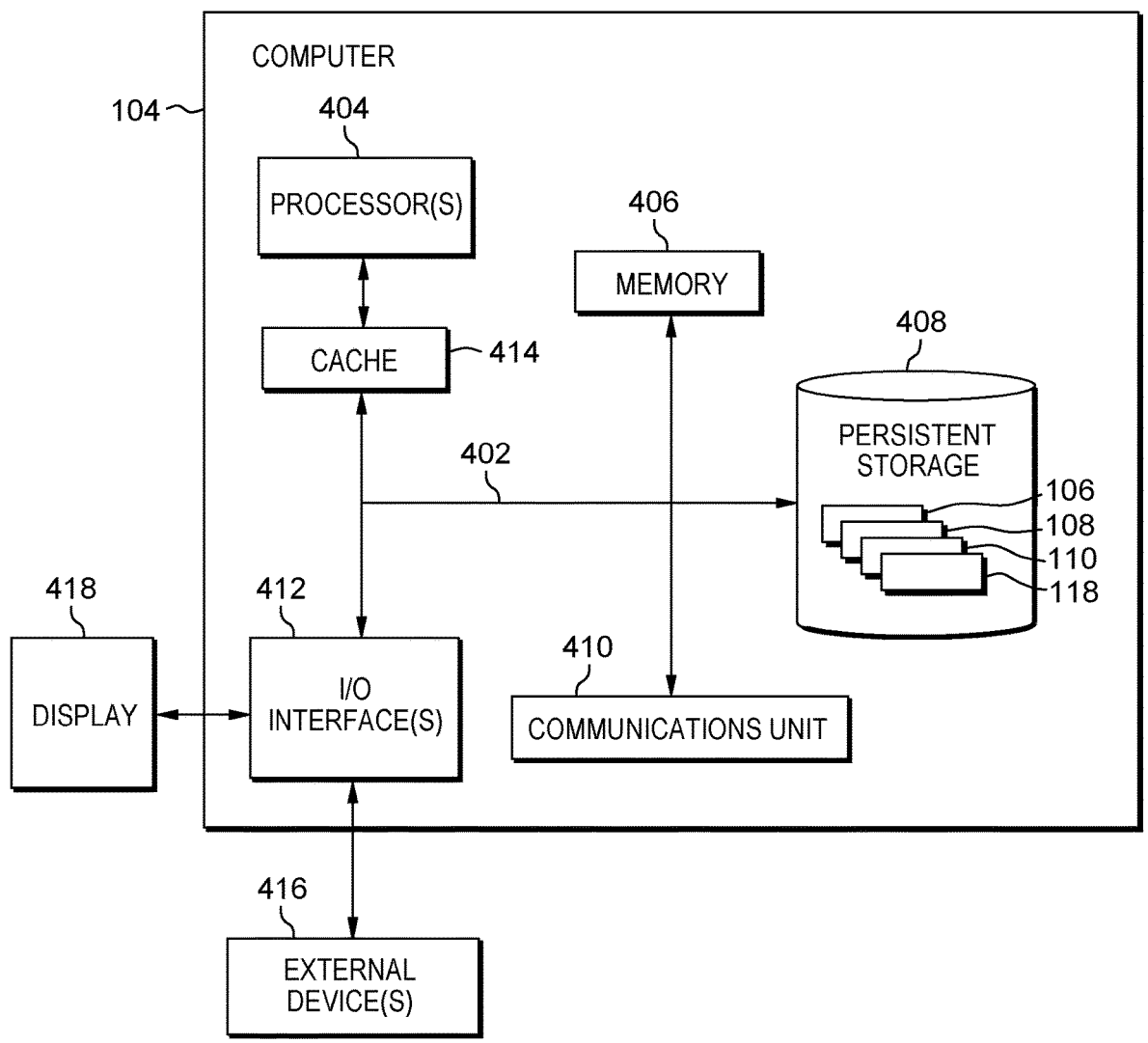
FIG. 4 depicts a block diagram of components of the server computer executing the reconfiguration program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., reconfiguration program 110 and database 118, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 120. In these examples, communications unit 410 includes one or more network interface cards. Communications unit 410 may provide communications through the use of either or both physical and wireless communications links. Reconfiguration program 110, database 118, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., reconfiguration program 110 and database 118, on server computer 104, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving, by one or more computer processors, an active system configuration and a target system configuration from a system administrator, wherein the target system configuration includes two or more logical partitions of a virtualized computing system environment, and wherein each of the two or more logical partitions is a subset of hardware resources of a server computer;
determining, by one or more computer processors, one or more reconfiguration actions required to transform the active system configuration to the target system configuration;

generating, by one or more computer processors, a dependency graph based on the determined one or more reconfiguration actions;
dividing, by one or more computer processors, the dependency graph along the two or more logical partitions;
sorting, by one or more computer processors, the determined one or more reconfiguration actions by associated dependencies;
ordering, by one or more computer processors, the determined one or more reconfiguration actions based on a priority of each of the two or more logical partitions;
running, by one or more computer processors, in a simulation environment firmware, a first live simulation of the determined one or more reconfiguration actions for each of the two or more logical partitions; and
based on the simulation, performing, by one or more computer processors, the determined one or more reconfiguration actions for each of the two or more logical partitions.

2. The computer-implemented method of claim 1, further comprising:
analyzing, by one or more computer processors, a result of the first simulation;
determining, by one or more computer processors, a problem with at least one of the determined one or more reconfiguration actions is identified in the first simulation;
determining, by one or more computer processors, the problem is associated with one or more additional dependencies;
adding, by one or more computer processors, the one or more additional dependencies to the dependency graph; and
running, by one or more computer processors, a second simulation.

3. The computer-implemented method of claim 2, further comprising:
notifying, by one or more computer processors, the system administrator of the problem.

4. The computer-implemented method of claim 1, wherein the determined one or more reconfiguration actions include at least one of adding, modifying, and deleting one or more input/output (I/O) elements of the active system configuration.

5. The computer-implemented method of claim 1, wherein the dependency graph is a data structure that represents how different input/output (I/O) elements in the active system configuration depend on each other.

6. The computer-implemented method of claim 5, wherein the input/output (I/O) elements include at least one of: an application, a logical partition (LPAR), a function, a channel path, a control unit, and a device, and wherein dependencies between the I/O elements include at least one of a partition to a function dependency, a partition to a channel path dependency, a channel path to a control unit dependency, and a control unit to a device dependency.

7. The computer-implemented method of claim 1, wherein the priority of each of the two or more logical partitions is based on a customer preference.

8. A computer program product comprising:
one or more computer readable storage medium and program instructions collectively stored on the one or more computer readable storage medium, the stored program instructions comprising:
program instructions to receive an active system configuration and a target system configuration from a system administrator, wherein the target system configuration includes two or more logical partitions of a virtualized computing system environment, and wherein each of the two or more logical partitions is a subset of hardware resources of a server computer;
program instructions to determine one or more reconfiguration actions required to transform the active system configuration to the target system configuration;
program instructions to generate a dependency graph based on the determined one or more reconfiguration actions;
program instructions to divide the dependency graph along the two or more logical partitions;
program instructions to sort the determined one or more reconfiguration actions by associated dependencies;
program instructions to order the determined one or more reconfiguration actions based on a priority of each of the two or more logical partitions;
program instructions to run, in a simulation environment firmware, a first live simulation of the determined one or more reconfiguration actions for each of the two or more logical partitions; and
based on the simulation, program instructions to perform the determined one or more reconfiguration actions for each of the two or more logical partitions.

9. The computer program product of claim 8, the stored program instructions further comprising:
program instructions to analyze a result of the first simulation;
program instructions to determine a problem with at least one of the determined one or more reconfiguration actions is identified in the first simulation;
program instructions to determine the problem is associated with one or more additional dependencies;
program instructions to add the one or more additional dependencies to the dependency graph; and
program instructions to run a second simulation.

10. The computer program product of claim 9, the stored program instructions further comprising:
program instructions to notify the system administrator of the problem.

11. The computer program product of claim 8, wherein the determined one or more reconfiguration actions include at least one of adding, modifying, and deleting one or more input/output (I/O) elements of the active system configuration.

12. The computer program product of claim 8, wherein the dependency graph is a data structure that represents how different input/output (I/O) elements in the active system configuration depend on each other.

13. The computer program product of claim 12, wherein the input/output (I/O) elements include at least one of: an application, a logical partition (LPAR), a function, a channel path, a control unit, and a device, and wherein dependencies between the I/O elements include at least one of a partition to a function dependency, a partition to a channel path dependency, a channel path to a control unit dependency, and a control unit to a device dependency.

14. The computer program product of claim 8, wherein the priority of each of the two or more logical partitions is based on a customer preference.

15. A computer system comprising:
one or more computer processors;
one or more computer readable storage media;
program instructions collectively stored on the one or more computer readable storage media for execution by at least one of the one or more computer processors, the stored program instructions comprising:

program instructions to receive an active system configuration and a target system configuration from a system administrator, wherein the target system configuration includes two or more logical partitions of a virtualized computing system environment, and wherein each of the two or more logical partitions is a subset of hardware resources of a server computer;

program instructions to determine one or more reconfiguration actions required to transform the active system configuration to the target system configuration;

program instructions to generate a dependency graph based on the determined one or more reconfiguration actions;

program instructions to divide the dependency graph along the two or more logical partitions;

program instructions to sort the determined one or more reconfiguration actions by associated dependencies;

program instructions to order the determined one or more reconfiguration actions based on a priority of each of the two or more logical partitions;

program instructions to run, in a simulation environment firmware, a first live simulation of the determined one or more reconfiguration actions for each of the two or more logical partitions; and based on the simulation, program instructions to perform the determined one or more reconfiguration actions for each of the two or more logical partitions.

16. The computer system of claim 15, the stored program instructions further comprising:

program instructions to analyze a result of the first simulation;

program instructions to determine a problem with at least one of the determined one or more reconfiguration actions is identified in the first simulation;

program instructions to determine the problem is associated with one or more additional dependencies;

program instructions to add the one or more additional dependencies to the dependency graph; and program instructions to run a second simulation.

17. The computer system of claim 15, wherein the determined one or more reconfiguration actions include at least one of adding, modifying, and deleting one or more input/output (I/O) elements of the active system configuration.

18. The computer system of claim 15, wherein the dependency graph is a data structure that represents how different input/output (I/O) elements in the active system configuration depend on each other.

19. The computer system of claim 18, wherein the input/output (I/O) elements include at least one of: an application, a logical partition (LPAR), a function, a channel path, a control unit, and a device, and wherein dependencies between the I/O elements include at least one of a partition to a function dependency, a partition to a channel path dependency, a channel path to a control unit dependency, and a control unit to a device dependency.

20. The computer system of claim 15, wherein the priority of each of the two or more logical partitions is based on a customer preference.

* * * * *